Patented Mar. 21, 1944

2,344,895

UNITED STATES PATENT OFFICE 2,344,895

BASIC CALCIUM ARSENATE

George W. Pearce and Alfred W. Avens, Geneva, N. Y.

No Drawing. Application June 18, 1940, Serial No. 341,179

2 Claims. (Cl. 23—53)

The present invention relates to insecticides and fungicides of the arsenic type, and its principal object is broadly to provide a commercial method of producing arsenicals of definite chemical composition so as to have consistent and easily reproducible properties. Various specific objects will become apparent as the description proceeds. While arsenic has long been recognized as a useful economic poison, the chief problem in its use as an insecticide has been the difficulty in standardizing the commercial products employed, due to the fact that they generally involved mixtures of various arsenical compounds having different chemical and physical properties. While considerable improvements have been made in such commercial arsenicals, they have continued to produce inconsistent behavior with respect to insect toxicity and plant injury. The difficulty appears to be due to the fact that in most prior processes it was practically impossible to obtain anything but mixtures of two or more species of arsenates. These prior processes started with arsenic acids and generally ended up with mixtures, instead of a definite compound. The only important exception in the commercial insecticide field is di-lead arsenate, which is a compound of definite composition, generally produced from litharge and arsenic acid, using acetic acid as a catalyst. Lead however has many objectionable qualities, particularly where the production of food is concerned. Unfortunately, arsenates of calcium and the other more desirable metals cannot be produced by the same type of reaction that produces di-lead arsenate.

The ordinary methods of making commercial calcium arsenate have started with arsenic acid and lime—generally a solution of arsenic acid being added to a slurry of lime, kept in a state of agitation, in such proportions that there remained about 10% uncombined lime. The resulting product consisted of a mixture of several different forms or compounds of calcium arsenate, such as dicalcium arsenate, tricalcium arsenate, basic calcium arsenate, and solid solutions of uncertain composition. The relative amounts of these depended on a number of factors such as concentration of reagents, temperature, rate of addition of the arsenic acid and efficiency of agitation. It is well known that the presence of dicalcium arsenate or other of the more soluble calcium arsenates, such as monocalcium arsenate or pentacalcium arsenate, in any appreciable amount, causes injury to plant foliage. More recent processes have been tried to prevent the formation of these more soluble arsenates, by introducing the arsenic acid to the slurry of lime under conditions designed to avoid local excesses of the acid, thus tending to form the more basic compounds; and subsequent heat treatments of the precipitates have been added to convert them to still more insoluble basic complexes of uncertain composition—though excessive heat tends to reduce the toxicity. In spite of the fact that notable improvements have been made in commercial calcium arsenates by such procedures, such products continue to exhibit inconsistent behavior in the field, due to the presence of mixtures of two or more species of calcium arsenates. They have eliminated to a large extent the more soluble calcium arsenates in the products but have not produced a product having a single definite species of calcium arsenate. Until such an ideal is reached, we may expect to find considerable variation in the behavior of the products in the field.

By the present invention it is possible to commercially produce a single definite species of calcium arsenate, namely, basic calcium arsenate, and definite compounds with various other useful metals, including lead—though the process is entirely different from the previous lead method above mentioned. The process differs fundamentally from the prior processes in that it uses dicalcium arsenate as the starting material, instead of arsenic acid. The number of materials which can be made to react with dicalcium arsenate appears to be limited only by their ability to supply electro-positive radicals or groups which can under various conditions wholly or in part displace either the calcium or the hydrogen contained in dicalcium arsenate. It thus opens up the field of arsenicals to a wide range of metals and their compounds besides CaO, such as zinc, copper, lead, nickel, iron, aluminum, tin, chromium, magnesium, manganese, cobalt, titanium, cadmium, barium, strontium, potassium, sodium, and bismuth. Many of the metals and their compounds have a useful function as correctives or preventatives against arsenical injury to foliage or fruit.

The new process will first be described as applied to the production of basic calcium arsenate, followed by its application to other metals, so as to make its principles clear to those skilled in the art. One distinguishing characteristic of the process is that it uses dicalcium arsenate as the starting material, instead of arsenic acid, thus avoiding the difficulties previously encountered.

I. *Preparation of basic calcium arsenate.*—The purpose here is to produce a basic calcium arsenate of definite composition suitable for use as an insecticide. The method makes use of dicalcium arsenate as the arsenic bearing starting material. We have found that if lime and dicalcium arsenate ($CaHAsO_4H_2O$) are mixed and heated in the presence or absence of moisture they react to form a basic calcium arsenate having a molecular ratio of CaO to $As_2O_5$ of 3.33. A basic salt of this ratio has the empirical formula: $[Ca_3(AsO_4)_2]3.Ca(OH)_2.(H_2O)x$ and it is only necessary to add lime to the dicalcium arsenate in slight excess over the theory required to convert $CaHAsO_4.H_2O$ to $[Ca_3(AsO_4)_2]3.Ca(OH)_2$. Any excess lime remains unchanged and can be removed by any leaching process leaving the basic calcium arsenate. The reaction proceeds rapidly at temperatures in the neighborhood of 100° C. (212° F.) or higher, but proceeds only at slow speed when the temperature is maintained below about 60° C.

The following example illustrates the application of the principles outlined in the previous paragraph.

One hundred and fifty-five (155) parts of pulverized dicalcium arsenate are mixed for one-half hour with fifty-five (55) parts of hydrated lime ($Ca(OH)_2$) or its equivalent of quick-lime (42 parts CaO) in a ball-mill or other suitable mixing machine. After thus mixing thoroughly the mixture is placed in an autoclave and heated for 2 hours at 10–15 kilograms per square centimeter vapor (140–210 lbs./sq. in.) steam pressure. If it is desired, lower pressures may be employed but the length of time of autoclaving must be increased in order to obtain the same results. The product is removed from the autoclave and while no drying is needed if care is taken to prevent excessive condensation of moisture on the material when the pressure is lowered in the autoclave, a superficial grinding operation is necessary to convert the product into a material suitable for use in preparing insecticidal sprays or dusts.

The product obtained by the foregoing procedure consists of about 90% basic calcium arsenate and 10% free or uncombined calcium hydroxide ($Ca(OH)_2$). It will have a total arsenic content of about 46% $As_2O_5$ and a water-soluble arsenic content of about 0.40% $As_2O_5$ by the method of Pearce et al. (New York State Agricultural Experiment Station Technical Bulletin 234, 1935). The calcium content expressed as CaO will be about 44%.

The proportions of dicalcium arsenate and hydrated lime used in the given procedure were chosen in order to obtain a product which would give a total arsenic content approximating that of commercial calcium arsenates. Actually one can produce a substantially pure basic calcium arsenate free from any appreciable amount of free or uncombined lime. To do this one should use the stoichiometrical proportions of hydrated lime or quick lime and dicalcium arsenate. These proportions are 125 parts of hydrated lime ($Ca(OH)_2$) to 500 parts of dicalcium arsenate (determined on the basis of using the monohydrated dicalcium arsenate: $CaHAsO_4.H_2O$). If one uses the anhydrous salt, $CaHAsO_4$, or the completely dehydrated salt calcium pyroarsenate, $Ca_2As_2O_7$, the amounts of the arsenate used should be proportionately less (i. e., 455 parts $CaHAsO_4$ or 432 parts $Ca_2As_2O_7$ per 125 parts $Ca(OH)_2$).

II.—*Use of dicalcium arsenate in the preparation of a zinc calcium arsenate suitable for use as an insecticide.*—This is covered in a divisional application Arsenical insecticides, filed August 9, 1943, Serial No. 497,970.

When arsenical sprays are used on plant foliage, arsenical injury to the foliage and the fruit frequently results. To avoid this difficulty, zinc, in the form of the powdered metal or certain of its compounds, has been used in the capacity of an arsenical injury preventive or corrective. The zinc-bearing material is commonly added to the spray mixtures in the spray tank as an individual substance, but in the present invention it is incorporated in the arsenical during manufacture. By treating dicalcium arsenate with a zinc-bearing material in excess, the following simple procedure may be used to obtain a zinc-calcium arsenate of suitable properties for use as an insecticide.

Seven (7) parts of powdered dicalcium arsenate are intimately mixed with 2.75 parts of powdered zinc oxide (ZnO) in a ball-mill or other suitable mixing machine. The mixture is then autoclaved for 2 hours at 10–15 kilograms per square centimeter (140–210 lbs./sq. in.) steam pressure. The product is removed and submitted to a superficial grinding operation to put it in condition for use as an insecticide. The composition of the product is as follows:

|  | Per cent |
|---|---|
| Total arsenic, expressed as $As_2O_5$ | 42 |
| Total zinc, expressed as ZnO | 33 |
| Total calcium, expressed as CaO | 22 |

The water-soluble arsenic content will be about 0.30% expressed as $As_2O_5$.

The product formed in the above process represents a case where the zinc has been introduced to form a zinc calcium arsenate. It is possible to form a zinc arsenate free of calcium starting with dicalcium arsenate and a soluble zinc compound, such as zinc nitrate. This is readily accomplished, for example, by boiling the powdered dicalcium arsenate in a solution of zinc nitrate. If conditions are controlled properly, basic zinc arsenate can be produced. The latter product is well known as a useful insecticide.

III.—*Use of dicalcium arsenate for the preparation of copper arsenicals having insecticidal and fungicidal value.*—This is covered in a divisional application Arsenical insecticides, filed August 9, 1943, Serial No. 497,969.

As in the case of zinc, copper and some of its compounds can act as arsenical injury correctives or preventives when used in an insecticidal spray or dust mixture. Weak Bordeaux mixture, for example, has proved very efficient in this capacity. We have found that if one treats dicalcium arsenate, itself a very toxic substance to plant foliage, with copper or various compounds of copper, a highly insoluble copper calcium arsenical is obtained which is substantially safe to foliage. When insoluble copper bearing materials are used to combine with dicalcium arsenate, it is best to mix the reactants intimately in a dry state and subject the mixture to an autoclaving operation for about 2 hours at 10–15 kgs./sq. cm. steam pressure. In the case of soluble copper materials the calcium arsenate may be treated by boiling the arsenate in a solution of the copper bearing material. By the latter procedure, for example, one can prepare basic copper arsenate, a newly introduced arsenical having good insecticidal and fungicidal properties. The following procedure results in a very pure basic copper arsenate (Cu(CuO)AsO₄).

Five (5) parts of powdered dicalcium arsenate are suspended in 100 parts of water and 2 parts of copper in the form of copper nitrate dissolved in about 5 parts of water are added. The mixture is heated to boiling and stirred for about ½ hour. The precipitate first formed in the mixture is a voluminous hydrated mass and on heating tends to dehydrate and become crystalline. The product is filtered off, dried, and ground. The analysis will be very close to the theory for basic copper arsenate (Cu(CuO)AsO₄).

IV. *The use of dicalcium arsenate in the preparation of various arsenicals having insecticidal and fungicidal value.*—As a further illustration of the principles indicated above, we have heat treated dicalcium arsenate in the presence of the representative materials given in the table. In each instance a reaction proceeds in which the dicalcium arsenate is converted to a more insoluble arsenate suitable for insecticidal and in some instances also fungicidal purposes.

*Table*

| Parts of dicalcium arsenate | Parts of reacting material |
| --- | --- |
| 155 | 48 zinc (powdered metal) |
| 155 | 47 copper (powdered metal) |
| 155 | 41 iron (powdered metal) |
| 155 | 43 nickel (powdered metal) |
| 155 | 20 aluminum (powdered metal) |
| 155 | 18 magnesium (powdered metal) |
| 7 | 4 cuprous oxide (powdered) |
| 7 | 4 cupric oxide (powdered) |
| 7 | 2 magnesium oxide (powdered) |

The various treatments indicated in table were carried out by intimately mixing the dicalcium arsenate with the various materials shown and then autoclaving the mixtures for 2 hours at 10–15 kgs. per sq. cm. The reacting materials were added in excess over that required to displace all the hydrogen present in the dicalcium arsenate. In general when dicalcium arsenate is treated with metals or their oxides the primary reaction appears to be displacement of the hydrogen and formation of a double salt such as calcium zinc arsenate, $Ca_2Zn(AsO_4)_2.XH_2O$. On the other hand if treated with sulfates, chlorides, nitrates and other salts or compounds of the metals, the reaction may result in displacement of both the hydrogen and calcium present in dicalcium arsenate with the formation of an arsenate of the metal whose salt was used in the treatment.

It will be evident from the above that the use of dicalcium arsenate as the starting material in place of the usual arsenic bearing starting materials makes possible the production of various arsenical preparations having consistent and easily reproducible chemical and physical properties. Among other advantages of dicalcium arsenate as a starting material are the following:

(a) Dicalcium arsenate can be easily and cheaply produced in a highly pure state.

(b) Its reaction with other substances can be controlled much more readily than in the case of such arsenic compounds as arsenic acid, with the result that products obtained from its use are more likely to be of a definite and reproducible composition.

(c) It can be made to react with substances either in a dry state or in the presence of water or its vapor.

(d) The number of materials which can be made to react with dicalcium arsenate appears to be limited only by their ability to supply electro-positive radicals or groups which can under various conditions wholly or in part displace either the calcium or the hydrogen contained in dicalcium arsenate. From the foregoing the application to other similar metals will be evident.

*The preparation of dicalcium arsenate*

Dicalcium arsenate in any of its possible forms does not appear to be commercially available at the present time. However, it may be easily and cheaply prepared on a commercial scale by several methods. The most readily applicable procedure makes use of the reaction between calcium carbonate ($CaCO_3$) and a solution of arsenic acid. As a source of calcium carbonate one may use such materials as limestone, marble, natural or precipitated chalk. For best results a finely powdered form of the carbonate is desirable. We have employed a pulverized limestone 100% of which passes through a 100 mesh screen and 85% passing through a 200 mesh screen and having a calcium carbonate content of 98%. The arsenic acid used is the same as that commonly employed in the manufacture of lead and calcium arsenates and is usually available in the form of a concentrated solution containing around 60% $As_2O_5$.

The following procedure has been used to prepare laboratory batches of dicalcium arsenate and can be carried over to large scale production with little difficulty.

A solution of arsenic acid is prepared containing 280 parts of $As_2O_5$ and around 2000 parts of water. This may be done by diluting the concentrated commercial acid in proportion to its $As_2O_5$ content. The diluted arsenic acid solution is brought to boiling and 200 parts of a pulverized calcium carbonate such as ground limestone or precipitated calcium carbonate suspended in 300–400 parts of water are added slowly with constant stirring. After all the calcium carbonate has been added the mixture is stirred while boiling for about one-half hour. The resulting precipitate is filtered off and may be dried or used wet.

The dicalcium arsenate obtained by the foregoing procedure will be a fine crystalline powder about 98% pure monohydrated dicalcium arsenate ($CaHAsO_4.H_2O$).

*Summary*

The methods described in the foregoing for producing arsenical compounds of definite composition having consistent and easily reproducible properties are based on the use of dicalcium arsenate as the arsenic bearing starting material. The results are free from the mixtures of arsenates which characterized prior processes using arsenic acid as the starting material. It will be understood that the process is not necessarily limited to the preparation of arsenicals containing only inorganic constituents, but can be applied to the preparation of arsenicals containing organic groups as well.

Moreover, since the anhydrous form ($CaHAsO_4$) of dicalcium arsenate as well as the completely dehydrated form known as calcium pyroarsenate ($Ca_2As_2O_7$) are readily returned to the monohydrated or other hydrated forms of dicalcium arsenate, it will be understood that the process includes the use of these other forms for the manufacture of arsenicals. The arsenicals described are particularly useful in controlling insect pests of plants, but it will of course be understood that they may also be used for any other purpose to which they are suited.

While we have in the foregoing given several specific examples of the type of process, it will be understood that these were merely by way of illustration to make clear the principles of the invention, which is not limited to the particular examples shown, but is susceptible to various modifications and adaptations in different instances as will be apparent to those skilled in the art, without departing from the scope of the invention as stated in the following claims.

We claim:

1. The method of preparing basic calcium arsenate, which consists in taking solid dicalcium arsenate, mixing it with an excess of lime, and heating it while intimately mixed, whereby basic calcium arsenate is produced.

2. The method of preparing basic calcium arsenate, which consists in taking solid dicalcium arsenate, mixing it with an excess of lime, heating it while intimately mixed at a temperature aove 50° centigrade, whereby basic calcium arsenate is produced.

GEORGE W. PEARCE.
ALFRED W. AVENS.